No. 852,113. PATENTED APR. 30, 1907.
C. D. GILMAN.
TIRE REPAIR AND PROTECTIVE DEVICE.
APPLICATION FILED DEC. 12, 1906.
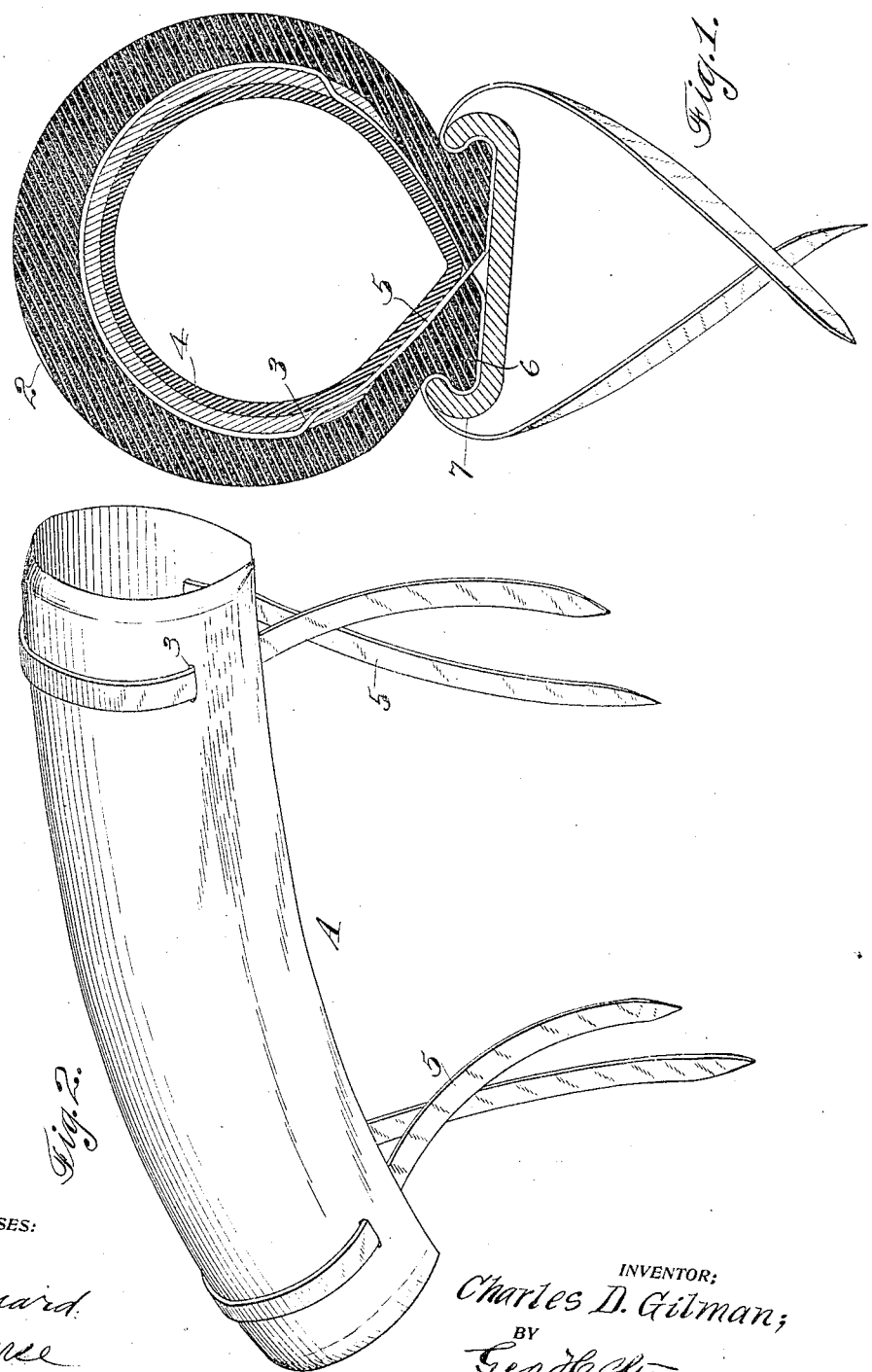
WITNESSES:
H. E. Maynard
C. H. Truss
INVENTOR:
Charles D. Gilman;
BY
Geo. H. Strong,
ATTORNEY

UNITED STATES PATENT OFFICE.

CHARLES D. GILMAN, OF OAKLAND, CALIFORNIA.

TIRE REPAIR AND PROTECTIVE DEVICE.

No. 852,113.  Specification of Letters Patent.  Patented April 30, 1907.

Application filed December 12, 1906. Serial No. 347,450.

*To all whom it may concern:*

Be it known that I, CHARLES D. GILMAN, a citizen of the United States, residing at Oakland, in the county of Alameda and State of California, have invented new and useful Improvements in Tire Repair and Protective Devices, of which the following is a specification.

My invention relates to a means for protecting the inner tubes of pneumatic tires, and a reinforce and repair device for strengthening weakened or broken outer casings.

It consists in the combination of parts, and details of construction which will be more fully explained by reference to the accompanying drawings, in which—

Figure 1 is a transverse section of an outer casing, inner tube, and wheel rim, showing the application of my device. Fig. 2 is a perspective view of the device, and a means for securing it.

The outer casings of automobile and similar wheel tires are subject to puncture, which will also frequently pass through the inner tube, and allow the air to escape, and the tire to become useless. These outer casings are also often damaged in such a manner that the canvas on which they depend for strength will be ruptured from internal pressure, and what are known as blow-outs take place; these blow-outs allowing the inner tube, which is of soft rubber, to be also burst and destroyed.

It is the object of my invention to provide an improved means for protecting the inner tubes from puncture or rupture, and to also form a temporary repair for the outer casings which have blown out, or are in danger of blowing out.

A represents a protective segment, technically known as a manchon, which is of such size as to fit within the outer casing 2, and to inclose the inner tube 4. This segment may be of any suitable or desired length to cover such length of the inner tube as may be found desirable, or several of such independent sections may be employed if found necessary. The ends and edges of this protective section are beveled down so that the inner tube, when inflated, will fit smoothly within the section, and also will pass from the section on to the adjacent contacting part without undue abruptness. Such devices have hitherto been employed for repair work, but without adequate means for securing them, and preventing their creeping and getting out of place. In my invention I employ stout lacing strings or straps 5, which may be attached to or connected with the segment A; and these straps are designed to pass across the meeting edges of the outer casing, thence around the enlarged lugs 6 by which the casing is locked into the curve 7 of the wheel rim; thence passing over and exterior to the wheel rim, the strings or straps may be tied and fastened in any suitable manner. I have here shown these straps as passing through slots or channels 3 made in the segment at any desired intervals. These slots or channels are preferably located near the edges of the segment, and the strap passing around the exterior of the segment, thence to these slots is then inserted into the slots, passing the rest of the way within the segment to its open edges, thence out through the meeting edges of the casing as previously described. When all parts are in place, and the inner tube is inflated, the pressure of the tube, and the interlocking of the lugs or flanges of the outer casing with the wheel rim, will bind these strips, and secure the protective sleeve firmly in place, preventing any creeping endwise, and thus maintaining it in position with relation to the rupture or weak point in the outer casing.

By making this protective sleeve continuous, it will occupy the whole interior of the casing, and thus strengthen a weakened casing, so that it may be used for a considerably longer time, and if made of a suitable resistant material it will largely or entirely prevent punctures of the inner tube by nails or other sharp substances.

Having thus described my invention, what I claim and desire to secure by Letters Patent is—

1. A repair device for a pneumatic tire, said device consisting of a segmental sheath to be interposed between the inner and outer tubes of said tire, and having tying portions which extend between the inner and outer tubes of the tire and between the outer tube and the wheel rim to a point outside of said tire.

2. The combination with the inner and outer tubes of a tire, and the wheel rim, of a sheath interposed between the two tubes, said sheath having extended strap-portions passing to the outside of the outer tube and between said tube and the rim, whereby the straps are clamped to hold the sheath in position.

3. In a tire consisting of an outer flexible casing and an inner air tube, a sleeve or segment having its ends and edges beveled and adapted to fit between the casing and tube, said sleeve having slots made in its sides, straps extending around the sleeve through the slots in the tube, and outwardly between the meeting edges of the casing so as to be clamped and held in place between the casing and the wheel rim.

4. A wheel rim having inturned flanges, an outer flexible tire casing having corresponding lugs to interlock with the rim, an inner air tube fitting within the casing, and a protective segmental sleeve fitting between the casing and the tube, said sleeve having slots made at intervals through its sides, straps surrounding the sleeve passing through the slots and out between the meeting edges of the casing, thence between the interlocking lugs and flanges of the wheel rim.

In testimony whereof I have hereunto set my hand in presence of two subscribing witnesses.

CHARLES D. GILMAN.

Witnesses:
C. FRED BURKS,
L. PETERSON.